P. L. REESE.

Improvement in Anti-Rattling Journals for the Balance Wheels of Sewing Machines.

No. 124,160.

Patented Feb. 27, 1872.

UNITED STATES PATENT OFFICE.

PHILIP L. REESE, OF MOUNT STERLING, KENTUCKY.

IMPROVEMENT IN ANTI-RATTLING JOURNALS FOR THE BALANCE-WHEELS OF SEWING-MACHINES.

Specification forming part of Letters Patent No. 124,160, dated February 27, 1872.

*To all whom it may concern:*

Be it known that I, PHILIP L. REESE, of Mount Sterling, Montgomery county, Kentucky, have invented certain Improvements in Anti-Rattling Journals for the Balance-Wheels of Sewing-Machines and other purposes; and that the following is a full, clear, and exact description of the same, which will enable others skilled in the art to make and use the said invention.

It is often found desirable to arrange a heavy drive or balance wheel on a short fixed journal-bearing instead of securing it on a long shaft journaled in bearings at its ends—as, for example, in the balance or drive wheel used on sewing-machines, or in the drive-wheel used for jewelers' lathes, where a long shaft would be in the way of the limbs of the operator—but this has been found difficult to accomplish satisfactorily in practice, for the reason that the short journal-bearing soon "wore loose" and allowed the wheel to "wabble" and "rattle" or slide on the journal, which was liable to throw the belt off and cause a disagreeable jar and noise. To remedy these objections to a short journal is the object of my invention, which consists in making the head of the journal with a conical bearing-face, and providing its rear and threaded end with a conical-faced follower-nut, and in making the ends of the axial-hole in the balance-wheel with corresponding conical bearing-faces, so that the balance-wheel, instead of bearing on the cylindrical spindle, as in other constructions, has its bearings on the conical faces of the head and follower-nut of the journal, which can be brought closer together as their faces or the bearing-faces of the wheel wear away, so as to secure a solid and noiseless journal for the wheel, even after an extended use.

Figure 1:
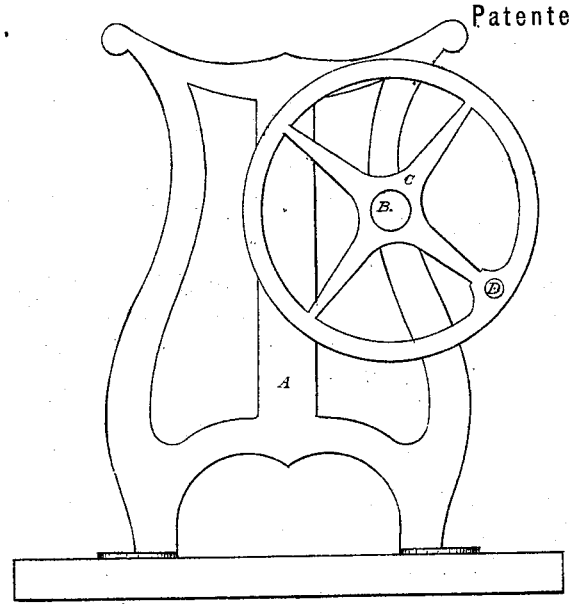
Figure 2:
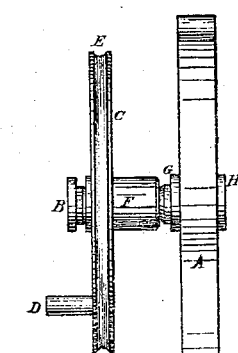
Figure 3:
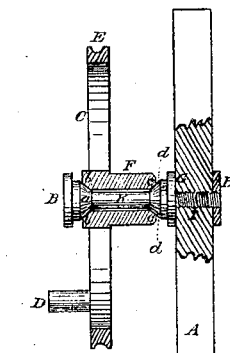
Figure 4:
Figure 5:
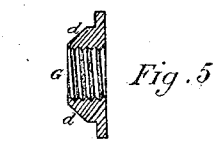

In the accompanying drawing, Figure 1 is a front view of a balance-wheel hung on my improved journal. Fig. 2 is a side view of the same. Fig. 3 is a sectional view of the same. Fig. 4 is a side view of the journal with the follower-nut thereon. Fig. 5 is a cross-section of the follower-nut.

A is the frame, in which the journal is secured, (which in the case of the sewing-machine mentioned would be the leg of the machine.) C is the balance-wheel, having the groove E for the driving-belt, and the crank-pin D, to which the treadle-link would be attached; and K I is the journal-bolt. The head B of this bolt is made with the conical bearing-face $a$, and the end I has a thread cut thereon, on which is placed the follower-nut G, which is made with the conical bearing-face $d$, as shown in Figs. 4 and 5. The axle-neck F of the wheel C is made with a cylindrical hole of a diameter slightly greater than that of the body K of the journal-bolt, and the ends of this hole are reamed out to form the conical bearing-faces $b$ and $c$ of inclinations corresponding with the conical faces of the head B and nut G; from which it is seen that when the journal-bolt K is inserted in the hole in the neck F and the follower-nut G is turned upon the threaded part I until brought to a bearing against said neck, the conical faces $a$ and $d$ of the head B and follower-nut G will form the bearings for the conical faces $b$ and $c$ of the neck of the wheel C, as shown in Fig. 3; and the wheel C will revolve on these conical bearings, instead of turning on the cylindrical part K of the journal-bolt, as in previous construction; from which it is evident that by keeping the follower-nut G turned up sufficiently to "take up" any wear on the conical bearings, the wheel C will run perfectly steady and without noise or unnecessary friction, even after an extended usage. It will be also seen that this arrangement reduces the bearing to a small surface at each end of the journal, and thus diminishes the journal friction without sacrificing the steady and solid bearing of the wheel obtained in other constructions by the use of a long axle-shaft, or of a journal-bearing of considerable length. After the journal-bolt K I is secured in the wheel C in the manner just shown, in order to secure the follower-nut G against working loose from the rotation of the wheel, and to fasten the journal-bolt K I in the required position, the end I is run through the frame A, and is secured at the outer end by the nut H, which clamps the frame between it and the nut G, thus securing the bolt K I in the required position, and also holding the follower-nut G from working loose.

I lay no broad claim to the use of conical bearings for wheels, as conical pivot-bearings of various construction have been before shown;

but, confining myself to the particular construction herein described,

What I claim as new, and desire to secure by Letters Patent, is—

The journal-bolt K I, with head B, having the conical bearing-face $a$, follower-nut G, with conical bearing-face $d$, and clamping-nut H, in combination with the wheel C, with conical bearing-faces $b$ $c$, and the frame A, said follower-nut acting as a clamping-nut in holding the journal-bolt in position and in holding itself from working loose, and the several parts being arranged and united substantially as specified.

As evidence of the foregoing witness my hand this 6th day of June, A. D. 1871.

PHILIP L. REESE.

Witnesses:
   THOS. C. ANDERSON,
   J. M. BENT.